United States Patent
Stahl

[11] 3,916,813
[45] Nov. 4, 1975

[54] SIX-DEGREE OF FREEDOM TOWING GEAR WITH CONSTANT THRUST LINE TOWING FORCE

[76] Inventor: Ralph G. Stahl, 7307 Monticello Blvd., Springfield, Va. 22150

[22] Filed: Jan. 24, 1974

[21] Appl. No.: 436,319

[52] U.S. Cl.................... 115/6; 73/147; 114/235 R
[51] Int. Cl.² ........................................ B63B 21/64
[58] Field of Search.......... 115/6, 7, 8; 73/148, 147; 114/235 R, 235 A, 235 B, 43.5

[56] References Cited
UNITED STATES PATENTS
3,052,120   9/1962   Goodman et al. .................... 73/147
3,610,196   2/1975   Lowry............................ 114/235 R Primary Examiner—Trygve M. Blix
Assistant Examiner—Sherman D. Basinger
Attorney, Agent, or Firm—R. S. Sciascia; Q. E. Hodges

[57] ABSTRACT

A towing gear capable of towing a non self-propelled model with a constant force in line with the would-be propulsive thrust, allowing the model freedom to move in all six degrees of motion. The gear comprises a rectangular rod structure, two mutually perpendicular subcarriage supporting rods, and a subcarriage which can move anywhere within the rectangle. A heave staff passing through the subcarriage is mounted to the towed model by a gimbal. A system of constant torque electric motors, gears, magnetic clutches, control circuitry, and further appropriate force transmission is used to exert the desired towing force in both magnitude and direction on the model.

12 Claims, 7 Drawing Figures

SIX-DEGREE OF FREEDOM TOWING GEAR WITH CONSTANT THRUST LINE TOWING FORCE

The invention described herein may be manufactured and used by or for the Government of the United States of America for Governmental purposes without the payment of any royalties thereon or therefor.

BACKGROUND OF THE INVENTION

Heretofore, in order to experimentally determine the maneuvering and other performance characteristics of marine vessels, self-propelled scale models of the bodies have been tested in a straight line, at predetermined radii and at turning radii limited by the test facility's geometry. The tests have been conducted in calm water and in a controlled environment of generated waves. A method offering more flexibility is the use of radio controlled models in a controlled environment but here the collection of data becomes comparatively complex and costly.

SUMMARY OF THE INVENTION

The towing gear described herein is capable of towing a non self-propelled model with a constant force in line with the would-be propulsive thrust while allowing the model freedom of motion in all 6°. The model's rudder and/or elevators are used to impart pitch and yaw angles to the model being tested. The present invention is designed to sense any pitch and/or yaw angles imparted to the model, to develop signals indicative thereof, and to utilize such signals to maintain a constant force on the model which is in line with the thrust axis of the model, regardless of the yaw or pitch angle of the model. Thus, the model can be tested in either calm water or in waves under any desired maneuvering schemes.

OBJECTS OF THE INVENTION

It is a general object of this invention to provide a towing gear which eliminates the need for a propulsion system within the model.

Other objects, advantages and novel features of the invention will become apparent from the following detailed description of the invention when considered in conjunction with the accompanying drawings wherein;

DESCRIPTION OF THE PREFERRED EMBODIMENTS

Figure 1:
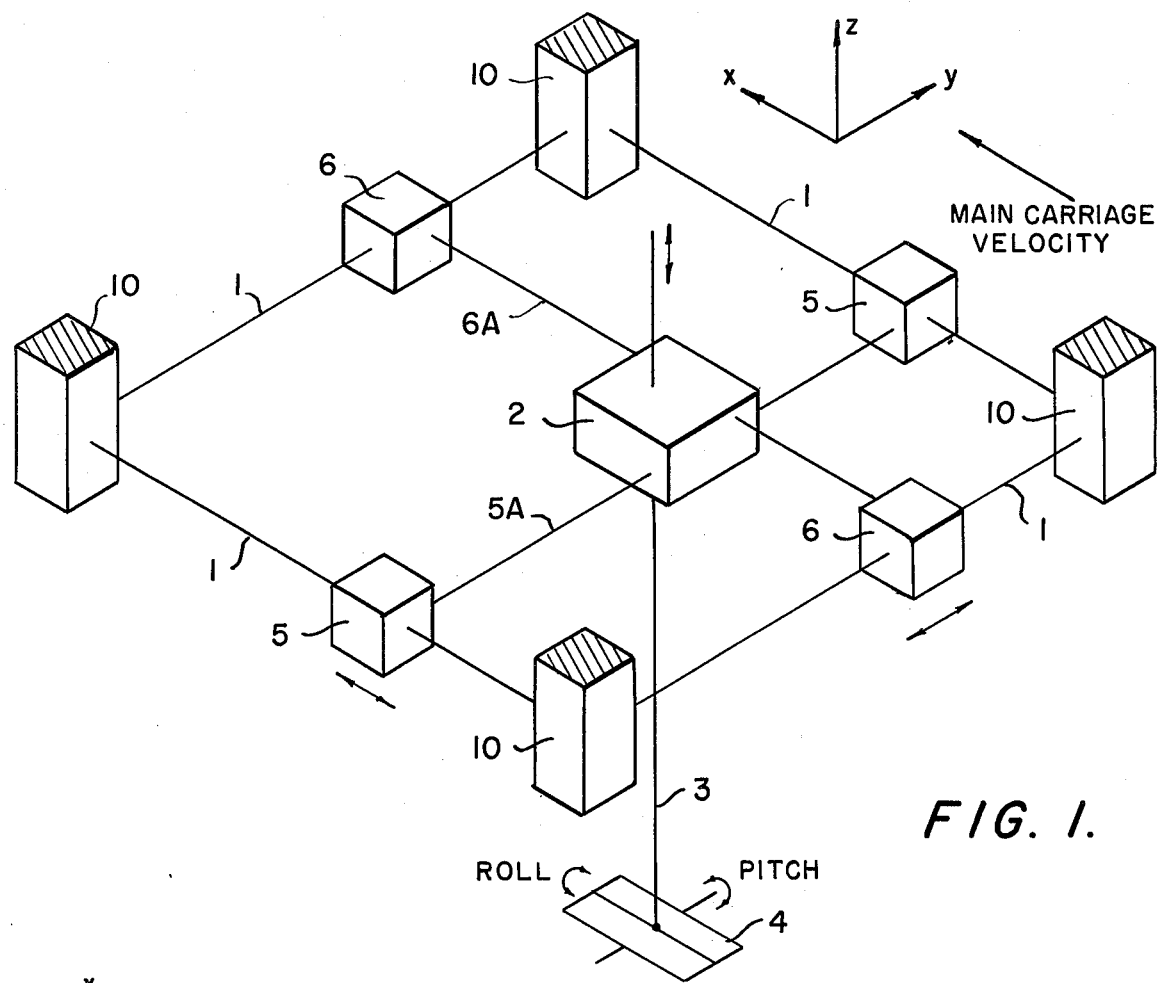
FIG. 1 is a perspective view of the towing gear of the invention.
Figure 2:
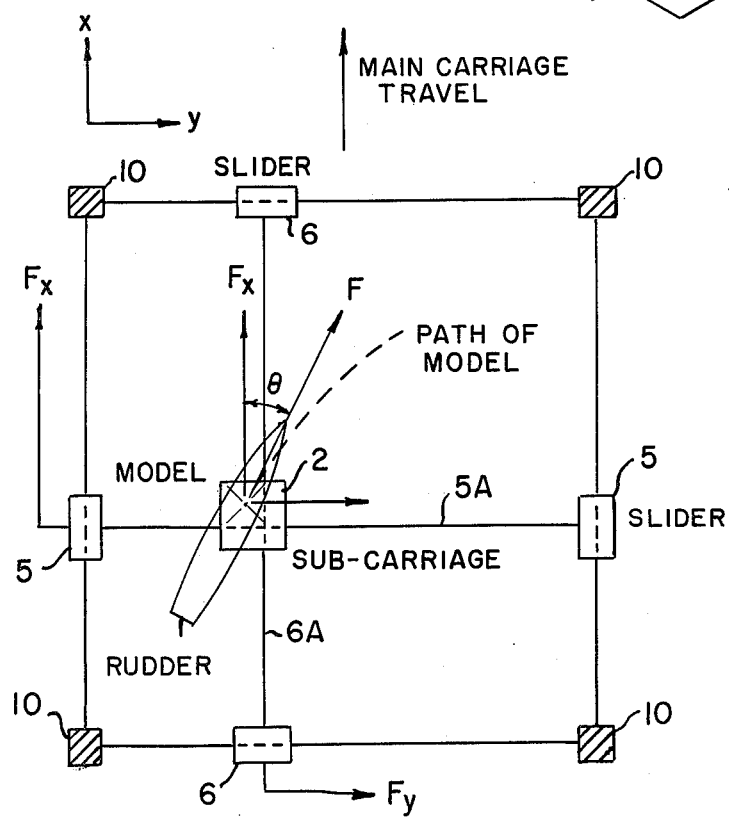
FIG. 2 is a top view of the towing gear of the invention.
Figure 3:
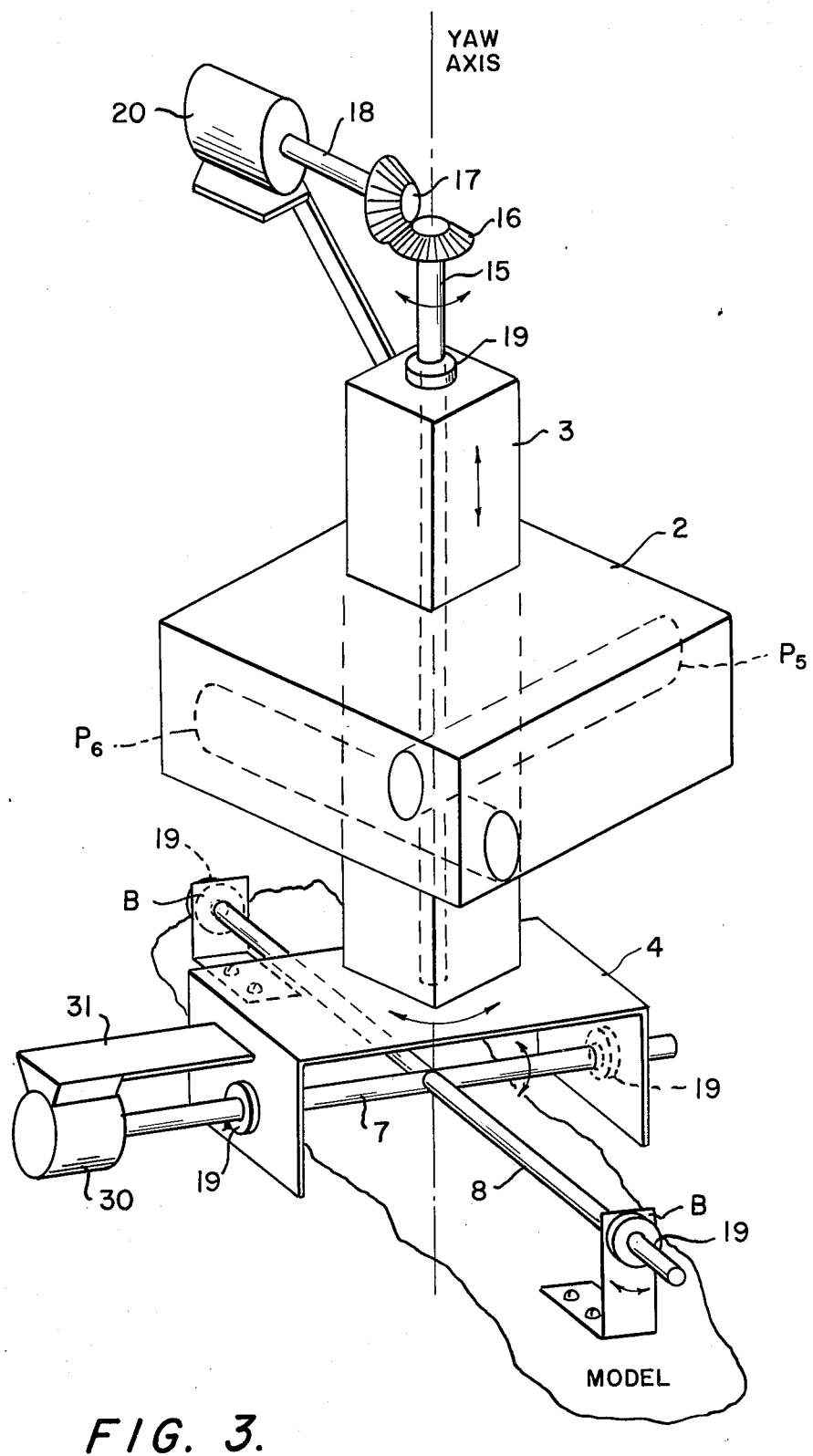
FIG. 3 is a detailed perspective of the subcarriage, model mounting means, and potentiometer mounting locations.

The towing gear as seen in FIG. 1 consists of four machined rods 1 arranged in a horizontal rectangle. The rods 1 are supported by four rigid posts, 10, which may be mounted rigidly to a towing basin carriage or to the stationary structure of a fluid circulating facility. The rods 1 serve as rails for the free movement of two mutually perpendicular non-intersecting machined rods 5A and 6A. Rods 5A and 6A are supported at their ends by sliding members 5 and 6, respectively, which are designed to move frictionlessly on ball bearings along the rails 1. At the apparent point of intersection of 5A and 6A, as seen in FIG. 2, is located the subcarriage 2. As seen in FIG. 3, subcarriage 2 is provided with two passageways, $P_5$ and $P_6$ of the same cross-sectional design as rails 5A and 6A, through which rods 5A and 6A extend. Subcarriage 2 is free to slide frictionlessly on ball bearings along rod 5A in the $y$ direction and along rod 6A in the $x$ direction as seen in FIG. 1. Consequently, the subcarriage 2 may be moved to any position in the horizontal $x, y$ coordinate system within the rectangle defined by rails 1 by movement of sliding members 5 in the $x$ direction and sliding members 6 in the $y$ direction. The heave staff 3 is connected to the towed model by means of a gimbal 4. The heave staff 3, as shown in detail in FIG. 3, is free to move frictionlessly within the subcarriage 2 along the $z$ axis but not rotationally about its axis as shown in FIG. 1, i.e. 3 is free to move only in the direction of heave of the towed model. Yaw axle 15 extends through heave staff 3 and is connected at its lower end to gimbal 4. Axle 15 is free to rotate around its longitudinal axis within the heave staff 3, which coincides with the z axis. The bottom of heave staff 3 is designed to permit rotational movement of gimbal 4 thereunder. The model is mounted by means of brackets B with the yaw axis passing through the wouldbe propulsion thrust vector. The gimbal 4 consists of a pitch axle 7 and a roll axle 8. Annular collars 19 are secured to yaw axle 15 and prevent it from sliding longitudinally within the heave staff 3, to the pitch axle 7 to prevent it from sliding longitudinally with respect to gimbal 4, and to the roll axle 8 to prevent brackets B and the model from sliding in line with the roll axis. Bevel gear 16, secured to yaw axle 15, meshes with bevel gear 17 which is connected to the shaft 18 of a combination sine and cosine potentiometer 20. Mounting bracket 21 is provided to secure potentiometer 20 to heave staff 3. Sine potentiometer 30 is mounted to gimbal 4 by means of a mounting bracket 31. If the model turns through a yaw angle $\theta$, as seen in FIG. 2, gimbal 4 and, likewise yaw axle 15 will turn through the same angle. Shaft 18 of the combination sine and cosine potentiometer 20 will, therefore, be rotated through an angle indicative of $\theta$. Similarly, if the model pitches at some angle $\phi$, pitch axle 7 will rotate in accordance with the angle $\phi$. Brackets B are free to rotate around roll axle 8 in accordance with the roll of the model.

Figure 5:
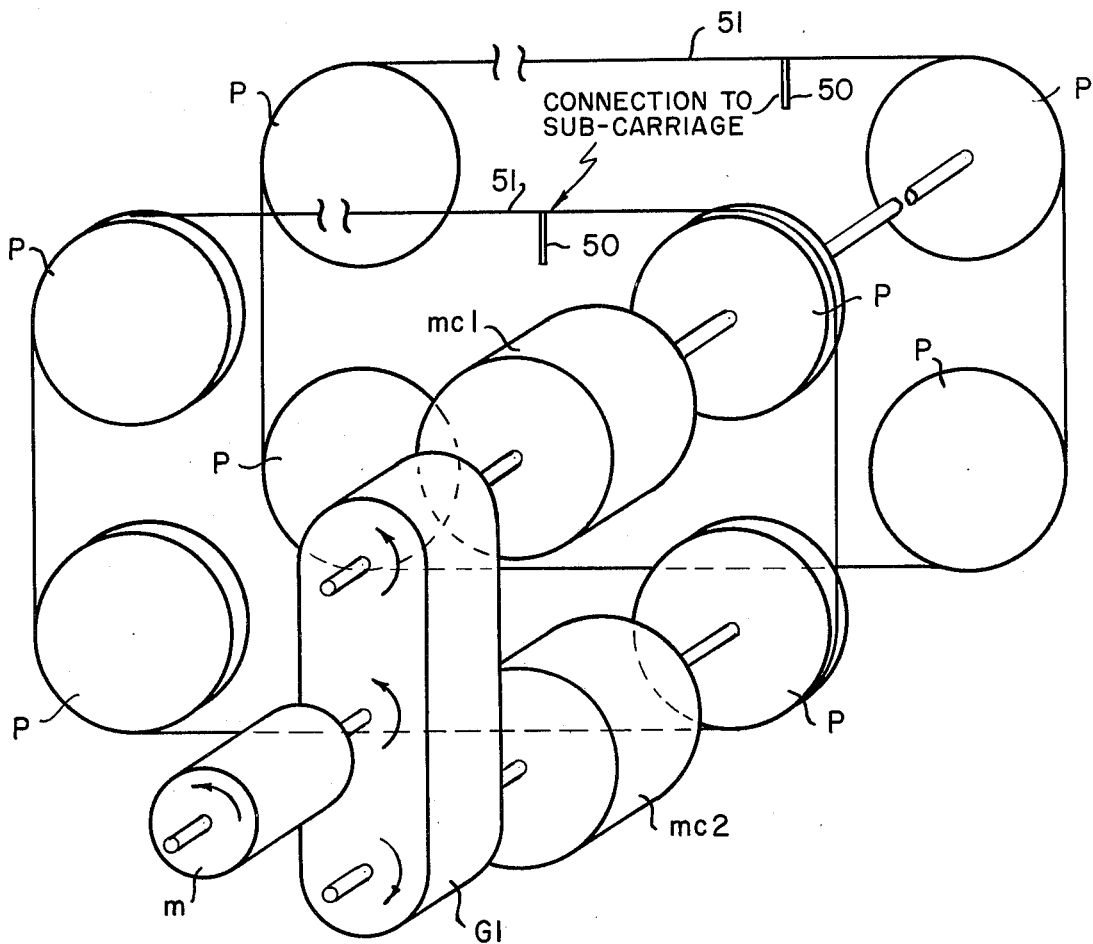
FIG. 5 is a detailed perspective of the horizontal force activating system of the invention.
Figure 4:
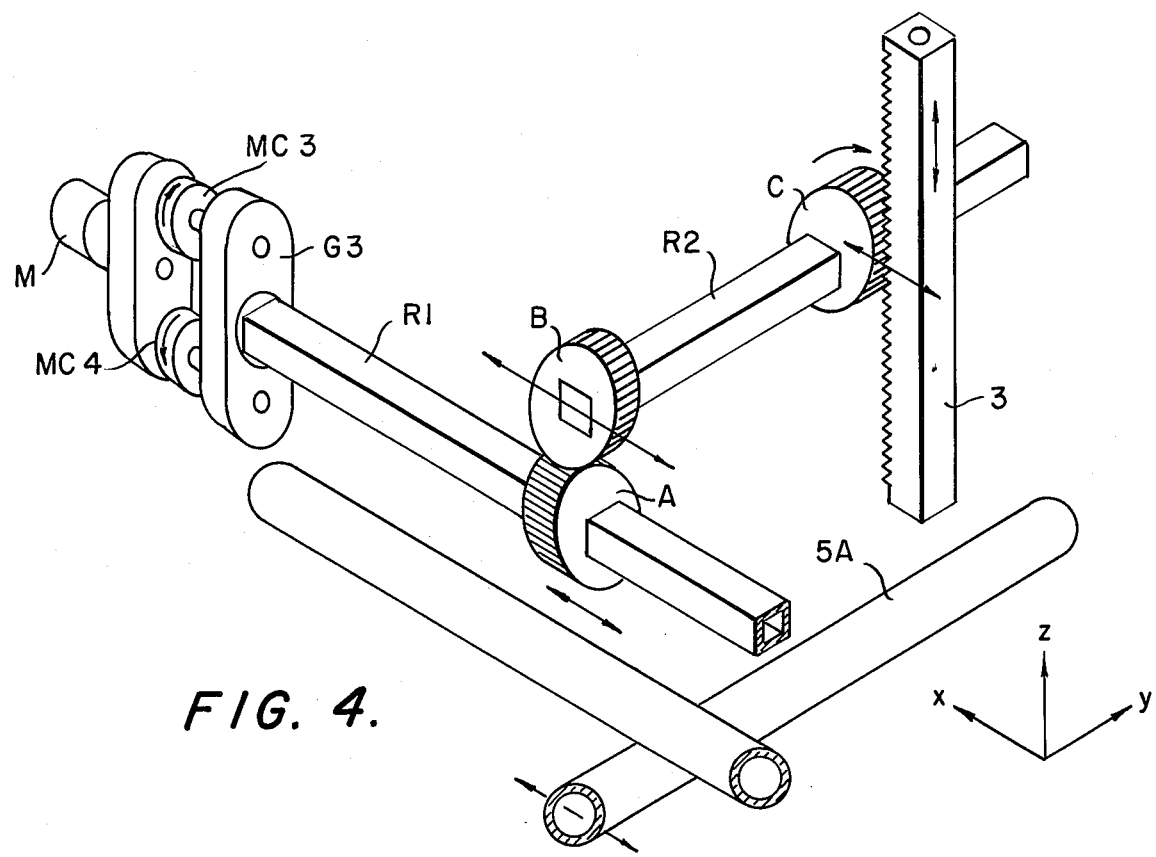
FIG. 4 is a detailed perspective of the vertical force activating system of the invention.

To activate each of the three translational degrees of freedom, three drive units each consisting of a constant torque electric motor, a system of gears, and a pair of contra-rotating magnetic clutches are used. Force transmission from the magnetic clutches in the z direction is shown in FIG. 4 and in the $x$ and $y$ directions in FIG. 5. Constant torque electric motor M in FIG. 5 furnishes torque to the single axle input of the gearbox G1 which is a double axle contrarotating output gearbox. Gearbox G1 furnishes torque to contra-rotating magnetic clutches MC1 and MC2, which clutches are energized by the control circuit shown in FIG. 6. Each clutch MC1 and MC2 drives two sets of pulleys P and drive belts or chains 51. There are two units such as is shown in FIG. 5; one unit drives the subcarriage in the X direction, the other drives it in the Y direction. Rigid rods 50 are connected to drive belts 51 at one end and to the subcarriage at the other end (not shown). Selectively energizing either clutch MC1 or MC2 allows the carriage to be moved in either direction along a given axis. The motor and pulleys shown in FIG. 5 may be mounted on the rigid posts 10 of FIG. 1 or on the main carriage.

Figure 6:
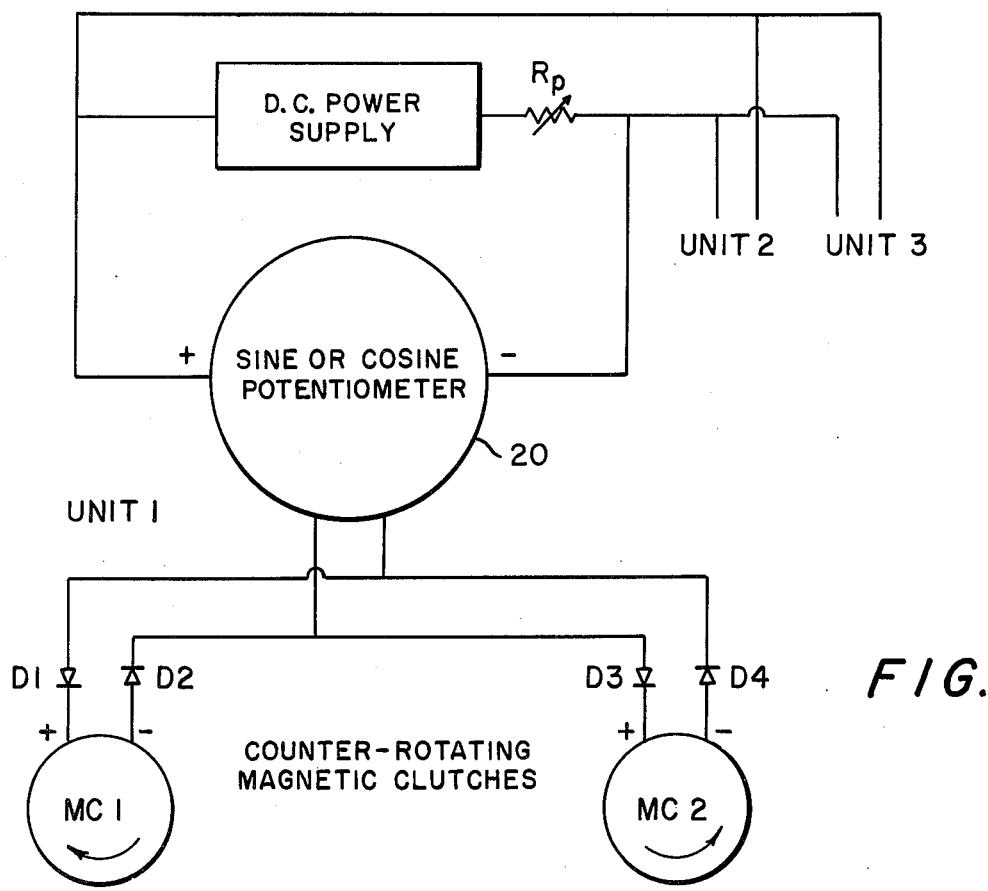
FIG. 6 is a network diagram of the control circuit of the invention used for energizing the drive means of FIGS. 4 and 5.

FIG. 6 shows the basic control circuit for energization of the contra-rotating magnetic clutches MC1 and MC2. The DC voltage from a constant voltage power supply is attenuated by a variable resistor $R_P$ in accordance with the total force F which is to be imparted to the model. The cosine potentiometer of unit 20 will determine the force $F_x$ applied in the x direction and the sine potentiometer of unit 20 will determine the force $F_y$ applied in the y direction. Activation of clutch MC1 or MC2 is determined by the sign of the voltage at the output of the sine or cosine potentiometer of unit 20 and is accomplished by the incorporation of rectifiers D1, D2, D3, and D4. For instance, if the model rotates in a clockwise direction through an angle $\theta$ as seen in FIG. 2, the output of the sine or cosine potentiometer of unit 20 will be of the polarity shown in FIG. 6 and, consequently, magnetic clutch MC2 will be activated. If, however, the model rotates in a counter-clockwise direction the output voltage of the sine or cosine potentiometer of unit 20 will be the reverse of that shown in FIG. 6, and consequently, magnetic clutch MC1 will be activated. In a two coordinate, x-y, system as shown in FIG. 2, the total force F imparted to the model is seen to be the vectorial sum of the forces $F_x$ in the x direction and $F_y$ in the y direction where 1. $F_x = F\cos\theta$ and 2. $F_y = F\sin\theta$.

Therefore, in the simple two coordinate system of FIG. 2,

3. $F = F_x + F_y$.

The thrust F is proportional to the voltage across the DC power supply and the variable resistor $R_p$. The total thrust F can, thus, be varied manually by varying the variable resistance $R_p$.

FIG. 4 shows the power transmission scheme for exerting a vertical force $F_z$ on the model under test. The basic control circuit of FIG. 6 would be used, the sine potentiometer 30 of FIG. 3 replacing unit 20 in FIG. 6. The constant torque motor M, the contra-rotating magnetic clutches MC3 and MC4 and the contra-rotating gearbox G2 comprise the same scheme as described in conjunction with FIG. 5 and need no further explanation. The output axles of MC3 and MC4, however, are brought back to a single axle output non-circular rod R1 by means of gear box G3. Helical gear A rotates helical gear B which in turn rotates helical gear C supported on non-circular rod R2. Gear C transmits the force to the geared heave staff 3. Thus, depending upon whether the model is pitched bow-up or bow-down, gear C will rotate counterclockwise or clockwise, respectively. Gears A and B are secured by suitable means (not shown) within a sliding member 5 (not shown in FIG. 4) and gear C is secured by suitable means (not shown) in the subcarriage 2 (not shown in FIG. 4). A passageway to accommodate R2 would also be provided in subcarriage 2. Gear A can slide along the rod R1 as the sliding member 5 moves in the x direction and gear C can slide along the rod R2 as the subcarriage 2 moves in the y direction. In the case where the pitch angle $\phi$ is critical, the total force imparted to the model will be 4. $F = F_x + F_y + F_z$.

where

5. $F_z = F\sin\phi$

In cases where the pitch angle $\phi$ is small, however, the vertically acting drive unit can be eliminated.

Figure 1A:
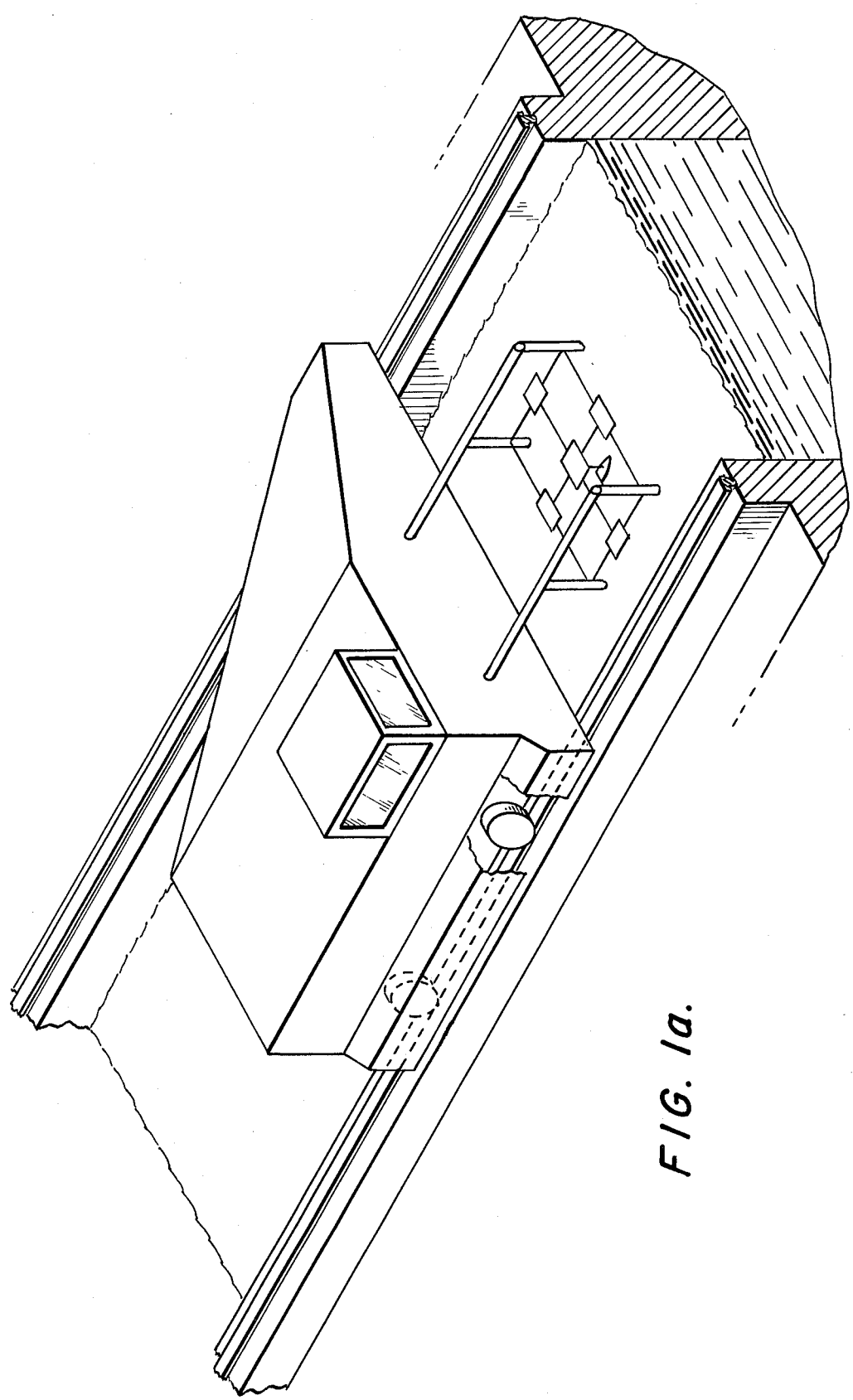
FIG. 1a is a perspective view of the towing gear of the present invention mounted on a land-based towing carriage.

As stated above, the towing gear disclosed herein can be mounted on a towing basin carriage or to the stationary structure of a fluid circulating facility. When it is mounted on a main land-based towing carriage as shown in FIG. 1a, the speed of the main carriage can be computed by knowing the intended model speed and model maneuvers. If necessary, the main carriage speed need not be constant and can be changed either manually or automatically in order to maintain the model within the rectangular support structure. The moving components of the towing gear linking the magnetic clutch outputs to the model should be as light in weight as possible in order to minimize inertial effects, reasonably rigid and as frictionless as possible. Minimization of friction can be achieved by the use of ball-bearings wherever possible and lubrication as is well known.

Obviously, many modifications and variations of the present invention are possible in the light of the above teachings. It is, therefore, to be understood that within the scope of the appended claims the invention may be practiced otherwise than as specifically described.

What is claimed is:

1. A towing gear for a non-self propelled vehicle comprising:

a land-based towing carriage;

attachment means for attachment to said vehicle;

drive means coupled to said attachment means and to said carriage for imparting to said attachment means and thereby to said non-self propelled vehicle a constant force which is in line with the longitudinal axis of said vehicle at all yaw, roll, and pitch angles and all heave, sway, and surge positions of said vehicle.

2. The towing gear of claim 1 wherein said drive means further includes staff means to impart said constant force to said vehicle regardless of the pitch angle of said vehicle.

3. The towing gear of claim 2 wherein said drive means includes pitch detector means for determining the pitch of said vehicle and for providing a pitch signal.

4. The towing gear of claim 3 wherein said drive means further includes heave force means for imparting to said vehicle a heave force in response to said pitch signal, said heave force being a component of said constant force.

5. The towing gear of claim 1 wherein said drive means includes yaw detector means for determining the yaw of said vehicle and for providing first and second yaw signals.

6. The towing gear of claim 5 wherein said drive means further includes first and second force means connected to said yaw detector means;
- said first force means being responsive to said first yaw signal;
- said second force means being responsive to said second yaw signal;
- whereby in response to said first yaw signal, said first force means imparts a first force to said vehicle and in response to said second yaw signal said second force means imparts a second force to said vehicle, said first and second forces being components of said constant force.

7. The towing gear of claim 6 wherein said drive means further includes:
- pitch detector means for determining the pitch of said vehicle and for providing a pitch signal;
- heave force means for imparting to said vehicle a heave force in response to said pitch signal;
- whereby said heave force is also a component of said constant force.

8. The towing gear of claim 1 wherein said attachment means comprises freedom of movement means for permitting said vehicle to yaw, roll, and pitch substantially unrestrained.

9. The towing gear of claim 1 wherein said drive means includes a subcarriage;
- two mutually perpendicular drive rods each passing through said subcarriage;
- said subcarriage being slideable along each said drive rod along the longitudinal axis of each said drive rod, in a horizontal plane;
- whereby said drive rods may move said subcarriage in any direction in said horizontal plane.

10. The towing gear of claim 9 wherein said drive means further includes staff means coupled to said attachment means for imparting to said vehicle a component of said constant force which component is perpendicular to said horizontal plane.

11. The towing gear of claim 1 wherein said drive means and said attachment means permit said vehicle to move in heave, sway, and surge substantially unrestricted.

12. A towing gear subcarriage comprising:
- first means including first and second mutually perpendicular; non intersecting passageways,
- a first rigid member (5a) extending through said first passageway and being movable in a direction perpendicular to the longitudinal axis of said first member;
- a second rigid member (6a) extending through said second passageway and being movable in a direction perpendicular to the longitudinal axis of said second member;
- said first means being slideable along said first and second rigid members;
- whereby movement of said first rigid member in said direction perpendicular to the longitudinal axis of said first member causes said first means to slide along said second rigid member and movement of said second rigid member in said direction perpendicular to the longitudinal axis of said second member causes said first means to slide along said first rigid member.

* * * * *